United States Patent
Winkler et al.

(10) Patent No.: US 12,435,682 B2
(45) Date of Patent: Oct. 7, 2025

(54) THRUST REVERSER CASCADE WITH OFFSET VANE LEADING EDGES

(71) Applicant: Rohr, Inc., Chula Vista, CA (US)

(72) Inventors: Julian Winkler, Glastonbury, CT (US); Wentaur E. Chien, San Diego, CA (US); Xiaolan Hu, San Diego, CA (US); Landy Dong, La Jolla, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/878,468

(22) Filed: Aug. 1, 2022

(65) Prior Publication Data

US 2024/0035427 A1   Feb. 1, 2024

(51) Int. Cl.
*F02K 1/60* (2006.01)
*F02K 1/70* (2006.01)

(52) U.S. Cl.
CPC ............. *F02K 1/605* (2013.01); *F02K 1/70* (2013.01)

(58) Field of Classification Search
CPC ... F02K 1/605; F02K 1/70; F02K 1/62; F05D 2240/129
See application file for complete search history.

(56) References Cited

U.S. PATENT DOCUMENTS

| | | |
|---|---|---|
| 3,261,165 A | 7/1966 | Smith |
| 3,721,314 A | 3/1973 | Hoch |
| 3,779,010 A | 12/1973 | Chamay |
| 4,030,290 A | 6/1977 | Stachowiak |
| 4,671,460 A | 6/1987 | Kennedy |
| 4,894,985 A | 1/1990 | Dubois |
| 5,058,837 A | 10/1991 | Wheeler |
| 5,097,662 A | 3/1992 | Vieth |
| 5,347,808 A | 9/1994 | Standish |
| 5,392,991 A * | 2/1995 | Gatti .................. F02K 1/60 60/232 |
| 6,029,439 A | 2/2000 | Gonidec |
| 6,151,883 A | 11/2000 | Hatrick |
| 6,402,092 B1 | 6/2002 | Jean |

(Continued)

FOREIGN PATENT DOCUMENTS

| | | |
|---|---|---|
| FR | 3097015 B1 | 12/2021 |
| WO | 2020224886 A1 | 11/2020 |

(Continued)

OTHER PUBLICATIONS

EP Search Report for EP Patent Application No. 23188988.2 dated Jan. 4, 2024.

*Primary Examiner* — Ted Kim
(74) *Attorney, Agent, or Firm* — Getz Balich LLC

(57) ABSTRACT

An apparatus is provided for an aircraft propulsion system. This apparatus includes a thrust reverser cascade extending longitudinally between a cascade forward end and a cascade aft end. The thrust reverser cascade extends laterally between a cascade first side and a cascade second side. The thrust reverser cascade extends radially between a cascade inner face and a cascade outer face. The thrust reverser cascade includes a plurality of vanes arranged in a longitudinally extending array. The vanes include a first vane and a second vane. A leading edge of the first vane is disposed on the cascade inner face. A leading edge of the second vane is recessed radially into the thrust reverser cascade from the cascade inner face.

20 Claims, 13 Drawing Sheets

(56) References Cited

U.S. PATENT DOCUMENTS

| | | | |
|---|---|---|---|
| 6,427,801 B1 * | 8/2002 | Dugan | B64D 33/02 |
| | | | 181/219 |
| 8,484,944 B2 | 7/2013 | Urban | |
| 9,068,532 B2 | 6/2015 | Gormley | |
| 9,086,034 B2 | 7/2015 | Aten | |
| 9,371,799 B2 | 6/2016 | Packard | |
| 9,719,466 B2 | 8/2017 | Nakhjavani | |
| 9,765,729 B2 | 9/2017 | Aten | |
| 9,915,226 B2 | 3/2018 | Gormley | |
| 9,970,387 B2 | 5/2018 | Frank | |
| 10,184,426 B2 | 1/2019 | Schrell | |
| 10,337,454 B2 | 7/2019 | Smith | |
| 10,556,672 B2 | 2/2020 | Paolini | |
| 10,590,885 B2 | 3/2020 | Acheson | |
| 10,598,127 B2 * | 3/2020 | Wadsworth | F02K 1/54 |
| 10,794,328 B2 | 10/2020 | Gormley | |
| 10,837,404 B2 | 11/2020 | Aziz | |
| 11,028,801 B2 | 6/2021 | Bourdeau | |
| 11,053,887 B2 | 7/2021 | Gormley | |
| 2008/0072571 A1 * | 3/2008 | Beardsley | F02K 1/72 |
| | | | 60/226.2 |
| 2010/0257841 A1 * | 10/2010 | Pero | F02K 1/70 |
| | | | 60/226.3 |
| 2012/0036716 A1 | 2/2012 | Urban | |
| 2013/0056554 A1 * | 3/2013 | Guillois | F02K 1/763 |
| | | | 239/265.19 |
| 2014/0027536 A1 * | 1/2014 | Gormley | F02K 1/72 |
| | | | 239/265.19 |
| 2015/0267643 A1 * | 9/2015 | Gonidec | F02K 1/72 |
| | | | 239/265.33 |
| 2016/0230702 A1 * | 8/2016 | Charron | F02K 1/766 |
| 2016/0243806 A1 | 8/2016 | Frost | |
| 2016/0341150 A1 | 11/2016 | Chuck | |
| 2017/0009704 A1 * | 1/2017 | Dong | F02K 1/72 |
| 2017/0058828 A1 | 3/2017 | Dong | |
| 2017/0058829 A1 * | 3/2017 | Dong | F02K 1/625 |
| 2017/0335771 A1 | 11/2017 | Post | |
| 2020/0003152 A1 | 1/2020 | Gormley | |
| 2020/0025138 A1 * | 1/2020 | Bourdeau | F02K 1/72 |
| 2022/0112864 A1 * | 4/2022 | Chilukuri | F02K 1/72 |
| 2022/0220925 A1 * | 7/2022 | Jodet | F02K 1/72 |
| 2022/0268237 A1 * | 8/2022 | Chilukuri | F02K 1/72 |

FOREIGN PATENT DOCUMENTS

| | | |
|---|---|---|
| WO | 2020224888 A1 | 11/2020 |
| WO | 2020224889 A1 | 11/2020 |

* cited by examiner

THRUST REVERSER CASCADE WITH OFFSET VANE LEADING EDGES

BACKGROUND

1. Technical Field

This disclosure relates generally to an aircraft propulsion system and, more particularly, to a thrust reverser for the aircraft propulsion system.

2. Background Information

An aircraft propulsion system with a turbofan or turbojet gas turbine engine may be configured with a thrust reverser system. The thrust reverser system is configured to redirect gas flowing within the aircraft propulsion system outward of the aircraft propulsion system and generally forward to produce reverse thrust. Various types and configurations of thrust reverser systems are known in the art. While these known thrust reverser systems have various benefits, there is still room in the art for improvement.

SUMMARY OF THE DISCLOSURE

According to an aspect of the present disclosure, an apparatus is provided for an aircraft propulsion system. This apparatus includes a thrust reverser cascade extending longitudinally between a cascade forward end and a cascade aft end. The thrust reverser cascade extends laterally between a cascade first side and a cascade second side. The thrust reverser cascade extends radially between a cascade inner face and a cascade outer face. The thrust reverser cascade includes a plurality of vanes arranged in a longitudinally extending array. The vanes include a first vane and a second vane. A leading edge of the first vane is disposed on the cascade inner face. A leading edge of the second vane is recessed radially into the thrust reverser cascade from the cascade inner face.

According to another aspect of the present disclosure, another apparatus is provided for an aircraft propulsion system. This apparatus includes a thrust reverser cascade extending longitudinally between a cascade forward end and a cascade aft end. The thrust reverser cascade extends laterally between a cascade first side and a cascade second side. The thrust reverser cascade extends radially between a cascade inner face and a cascade outer face. The thrust reverser cascade includes a plurality of vanes distributed longitudinally along the cascade inner face. The vanes include a first vane and a second vane. The first vane extends radially to a first vane leading edge. The second vane extends radially to a second vane leading edge. The first vane leading edge and the second vane leading edge are radially misaligned along the cascade inner face.

According to still another aspect of the present disclosure, another apparatus is provided for an aircraft propulsion system. This apparatus includes a thrust reverser cascade extending longitudinally between a cascade forward end and a cascade aft end. The thrust reverser cascade extends laterally between a cascade first side and a cascade second side. The thrust reverser cascade extends radially between a cascade inner face and a cascade outer face. The thrust reverser cascade includes a first rail, a second rail and a plurality of vanes laterally between and connected to the first rail and the second rail. The first rail extends radially to a rail leading edge. The vanes include a first vane and a second vane. The first vane extends radially to a first vane leading edge that is radially aligned with the rail leading edge. The second vane extends radially to a second vane leading edge that is recessed into the thrust reverser cascade and radially spaced from the rail leading edge.

A plane of the cascade inner face may have a straight sectional geometry.

The thrust reverser cascade may include a plurality of rails extending longitudinally along and connected to the vanes. A leading edge of each of the rails may be disposed on the cascade inner face.

The thrust reverser cascade may also include a rail extending longitudinally along and connected to the vanes. The rail may extend radially to a rail leading edge. The leading edge of the first vane may be radially aligned with the rail leading edge. The leading edge of the second vane may be spaced radially from the rail leading edge.

The first vane may be longitudinally forward of the second vane.

The first vane may be longitudinally aft of the second vane.

A trailing edge of the first vane may be disposed on the cascade outer face. A trailing edge of the second vane may be spaced radially from the cascade outer face.

A trailing edge of the first vane may be disposed on the cascade outer face. A trailing edge of the second vane may be disposed on the cascade outer face.

A radial height of the first vane may be different than a radial height of the second vane.

The vanes further may also include a third vane. A leading edge of the third vane may be disposed on the cascade inner face.

The second vane may be longitudinally between the first vane and the third vane.

The vanes further may also include a third vane. A leading edge of the third vane may be recessed radially into the thrust reverser cascade from the cascade inner face.

The leading edge of the second vane may be disposed a second vane distance from the cascade inner face. The leading edge of the third vane may be disposed a third vane distance from the cascade inner face that is equal to the second vane distance.

The leading edge of the second vane may be disposed a second vane distance from the cascade inner face. The leading edge of the third vane may be disposed a third vane distance from the cascade inner face that is different than the second vane distance.

The second vane may be longitudinally between the first vane and the third vane.

The first vane may be longitudinally between the second vane and the third vane.

The apparatus may also include a pivoting door thrust reverser system that includes the thrust reverser cascade.

The apparatus may also include a propulsion system structure that includes a flowpath and a thrust reverser system. The flowpath may extend within the propulsion system structure to an exhaust nozzle. The thrust reverser system may include the thrust reverser cascade. The thrust reverser cascade may be exposed to the flowpath when the thrust reverser system is stowed.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
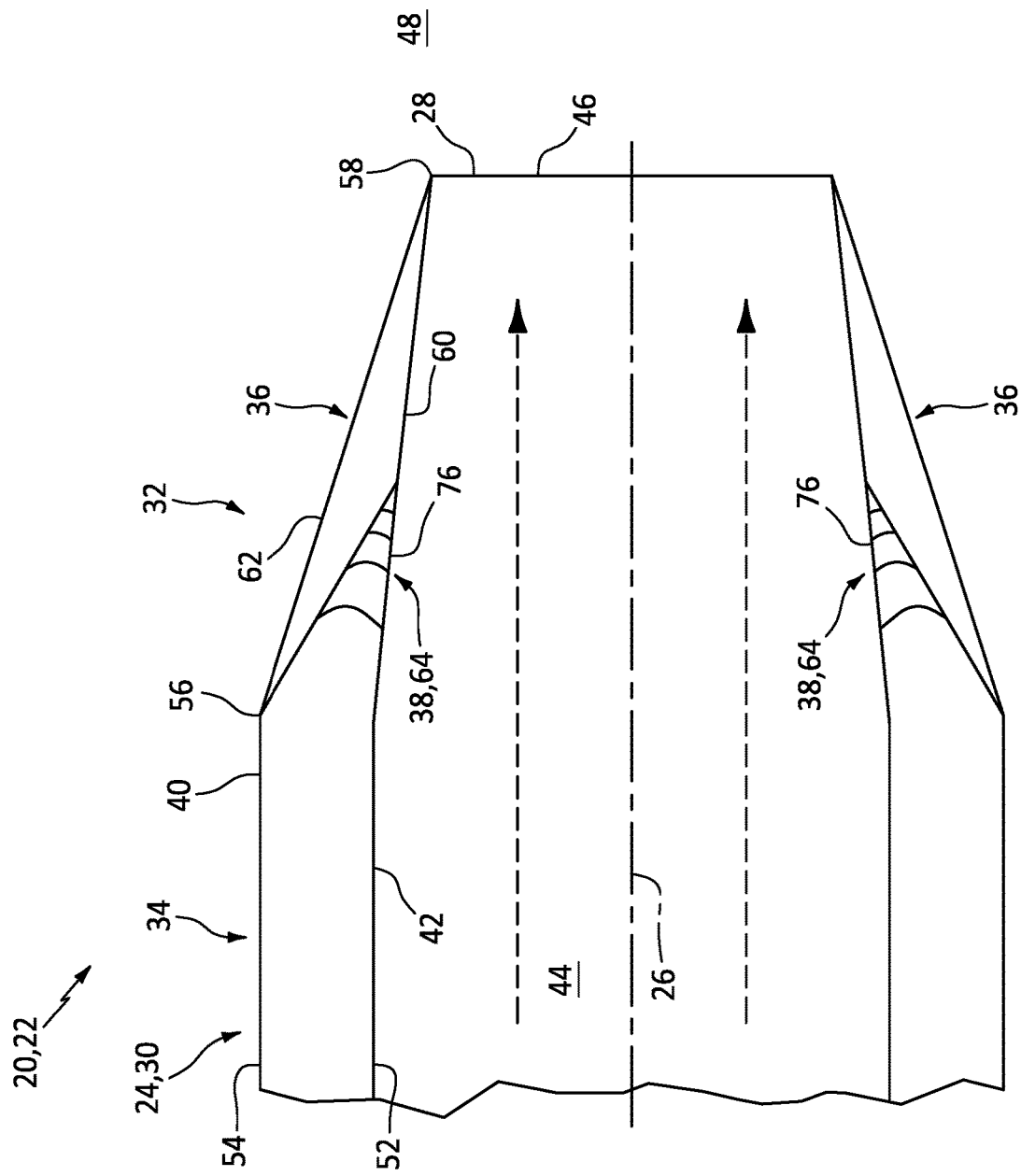
FIG. 1 is a side sectional schematic illustration of an aft section of an aircraft propulsion system with its thrust reverser doors stowed.
Figure 2:
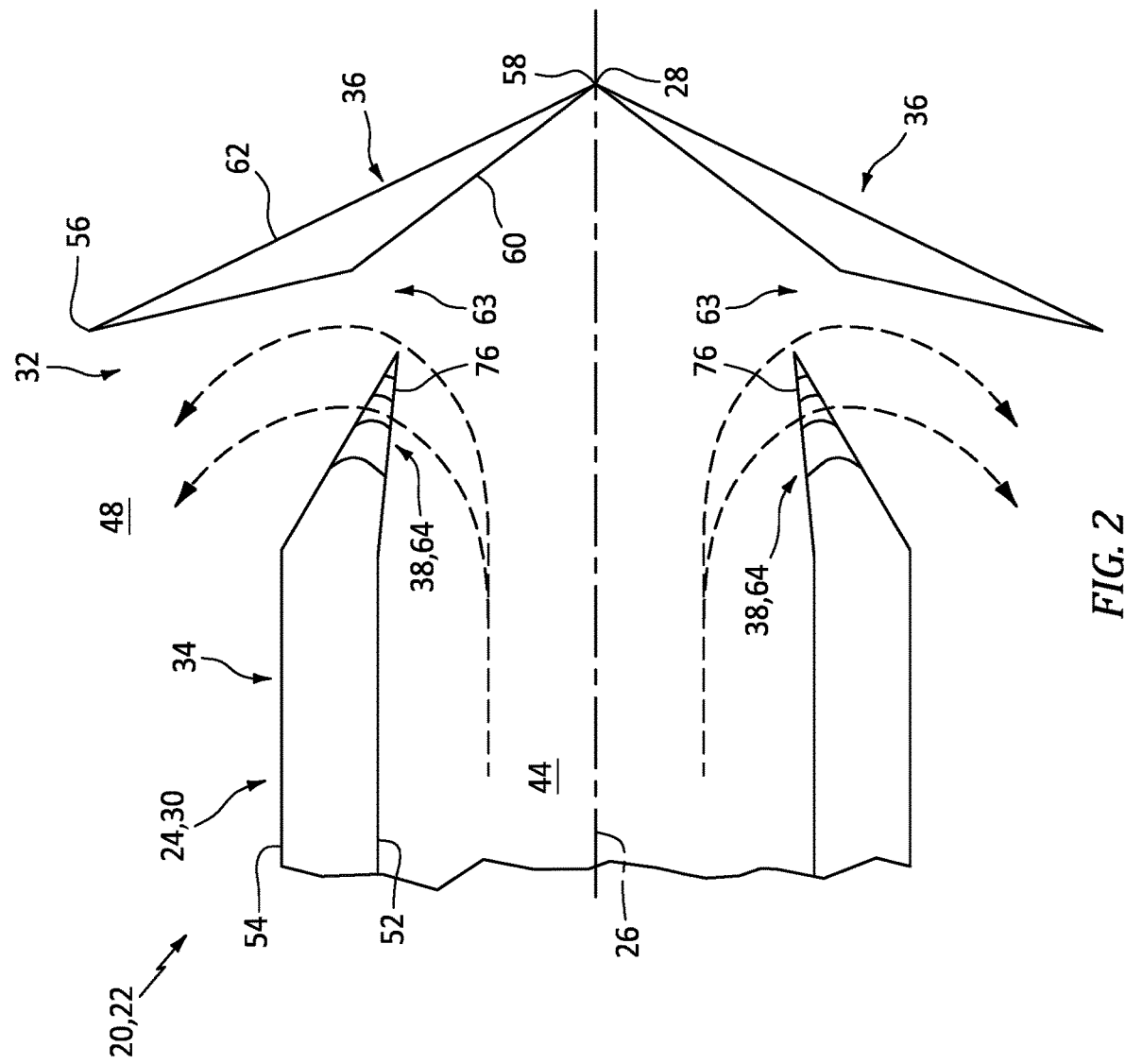
FIG. 2 is a side sectional schematic illustration of the aft section of the aircraft propulsion system of FIG. 1 with its thrust reverser doors deployed.

FIGS. 1 and 2 illustrate an aft section 20 of a propulsion system 22 for an aircraft such as, but not limited to, a commercial airliner or cargo plane. This aircraft propulsion system 22 includes a nacelle 24 and a gas turbine engine (not visible in FIGS. 1 and 2). The gas turbine engine may be configured as a turbojet gas turbine engine or a turbofan gas turbine engine; however, the present disclosure is not limited to such exemplary engine configurations.

The nacelle 24 is configured to house and provide an aerodynamic cover for the gas turbine engine. The nacelle 24 extends axially along an axial centerline 26 of the aircraft propulsion system 22 to a downstream, aft end 28 of the nacelle 24. The nacelle 24 of FIGS. 1 and 2 includes a nacelle aft structure 30 (a structure of the aircraft propulsion system 22) configured with a thrust reverser system 32. This thrust reverser system 32 is configured as a pivoting door thrust reverser system. More particularly, the thrust reverser system 32 may be configured as a target-type thrust reverser system. The term "target-type" may describe a pivoting door thrust reverser system that redirects a hot gas stream (e.g., a core gas stream) exhausted from the gas turbine engine, or both an outer cold gas stream (e.g., a bypass gas stream) and an inner hot gas stream (e.g., a core gas stream) exhausted from the gas turbine engine. It is contemplated, however, the thrust reverser system 32 may alternatively be configured as a clamshell-type thrust reverser system. The term "clamshell-type" may describe a pivoting door thrust reverser system that redirects an outer cold gas stream exhausted from the gas turbine engine, but not an inner hot gas stream exhausted from the gas turbine engine.

The aft structure 30 of FIGS. 1 and 2 includes a fixed structure 34, one or more (e.g., an opposing pair of) thrust reverser doors 36 and one or more cascade structures 38. Referring to FIG. 1, the aft structure 30 and its components (e.g., 34 and 36) are configured to form an aft portion of an outer aerodynamic flow surface 40 of the nacelle 24. The aft structure 30 and its components (e.g., 34, 36 and 38) are configured to form an aft portion of an inner aerodynamic flow surface 42 of the nacelle 24. This aft portion of the inner aerodynamic flow surface 42 forms an outer peripheral boundary of an aft-most portion of a flowpath 44 within the aircraft propulsion system 22. This aft-most portion of the flowpath 44 receives a gas flow (e.g., core gas and/or bypass air) from the upstream gas turbine engine. The aft-most portion of the flowpath 44 extends axially along the axial centerline 26 within the aircraft propulsion system 22 and its aft structure 30 to an annular trailing edge of an exhaust nozzle 46, at which point the flowpath 44 of FIG. 1 meets an exterior environment 48 surrounding the aircraft propulsion system 22. This exhaust nozzle 46 may be at least partially or completely formed by the thrust reverser doors 36 as shown in FIG. 1. Alternatively, referring to FIGS. 3 and 4, an aft portion 50 of the fixed structure 34 (or another standalone nozzle structure) may at least partially or completely form the exhaust nozzle 46. With such an arrangement, the thrust reverser system 32 may be termed a "pre-exit" thrust reverser system.

The fixed structure 34 of FIG. 1 extends axially along the axial centerline 26 to a downstream, aft end of the fixed structure 34. The fixed structure 34 extends radially between and to a radial inner side 52 of the fixed structure 34 and a radial outer side 54 of the fixed structure 34. The structure inner side 52 may partially form the inner aerodynamic flow surface 42. The structure outer side 54 may partially form the outer aerodynamic flow surface 40. The fixed structure 34 extends circumferentially about (e.g., completely around) the axial centerline 26, thereby providing the fixed structure 34 with, for example, a tubular body.

The thrust reverser doors 36 are arranged circumferentially about (e.g., on opposing sides of) the axial centerline 26. The thrust reverser doors 36 are moveably (e.g., pivotally) attached to the fixed structure 34. The thrust reverser doors 36 may thereby move (e.g., pivot) between a stowed, closed position (e.g., see FIGS. 1 and 3) and a deployed, open position (e.g., see FIGS. 2 and 4).

When in the stowed position of FIG. 1 (see also FIG. 3), each of the thrust reverser doors 36 extends axially along the axial centerline 26 between a forward end 56 of the respective thrust reverser door 36 and an aft end 58 of the respective thrust reverser door 36. Each of the thrust reverser doors 36 extends radially between and to a radial inner side 60 of the respective thrust reverser door 36 and a radial outer side 62 of the respective thrust reverser door 36. The door inner side 60 may partially form the inner aerodynamic flow surface 42. The door outer side 62 may partially form the outer aerodynamic flow surface 40. Each of the thrust reverser doors 36 extends circumferentially about (e.g., partially around) the axial centerline 26 providing the respective thrust reverser door 36 with an arcuate (e.g., partially conical) body.

Figure 3:
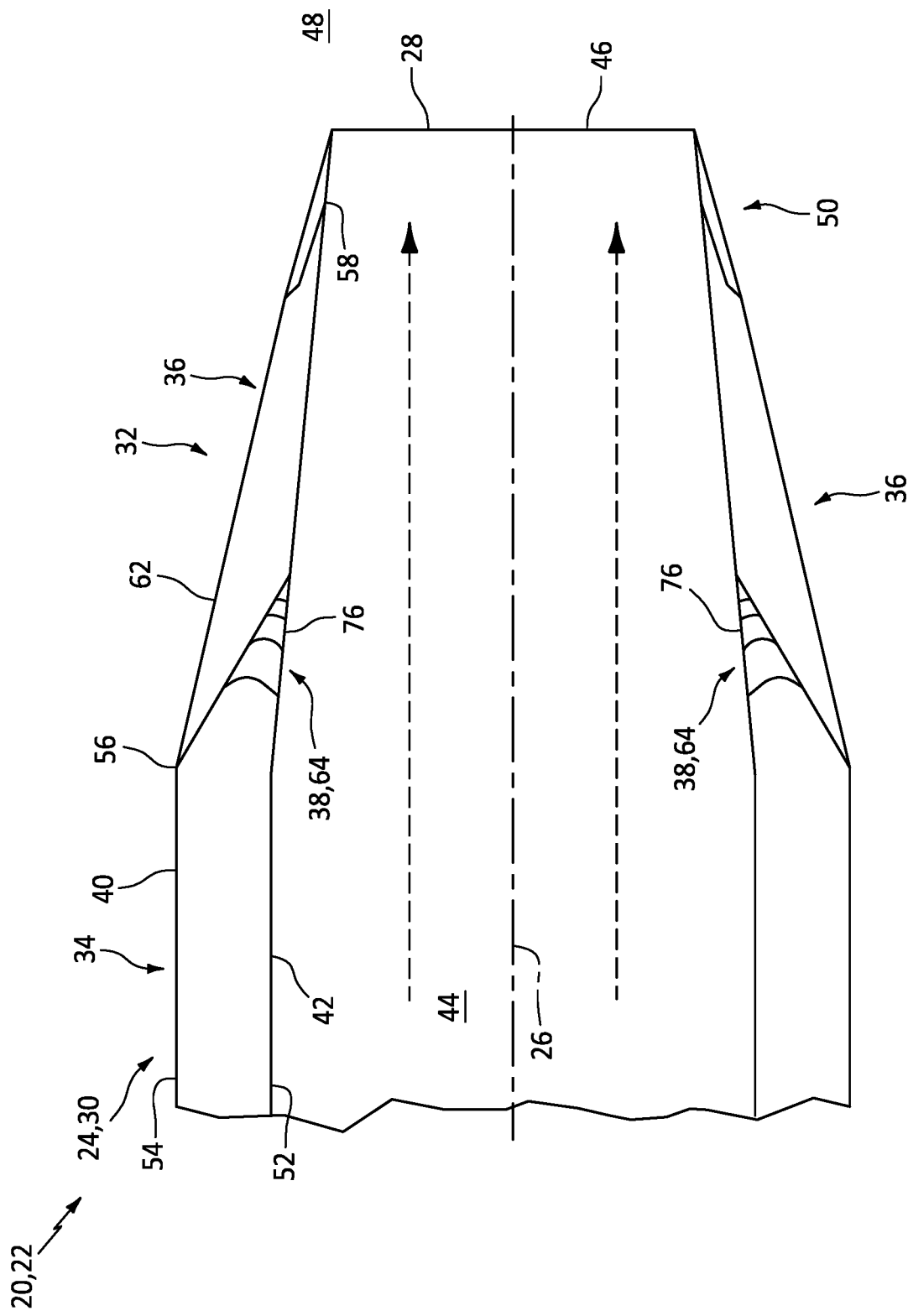
FIG. 3 is a side sectional schematic illustration of an aft section of another aircraft propulsion system with its thrust reverser doors stowed.
Figure 4:
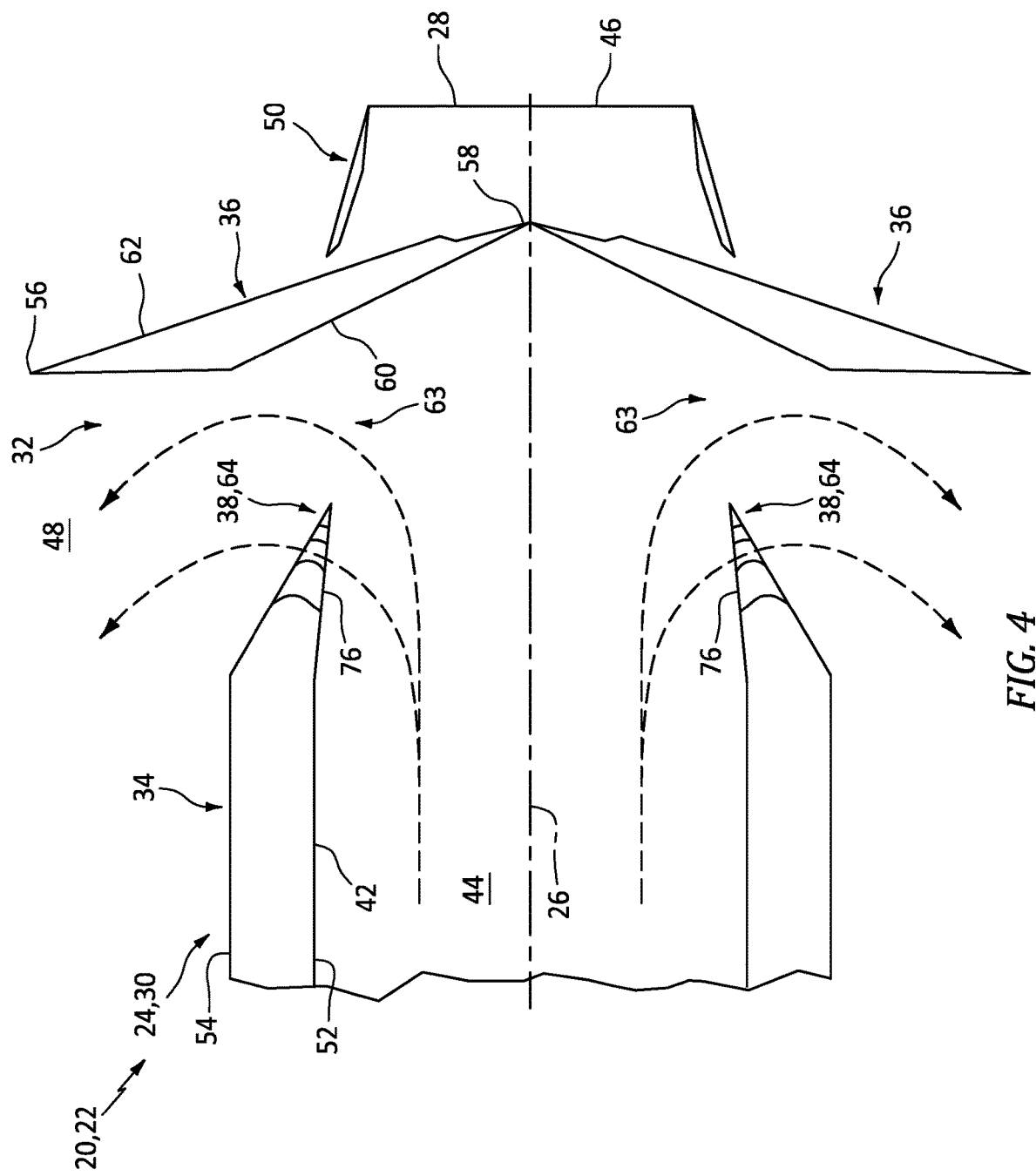
FIG. 4 is a side sectional schematic illustration of the aft section of the aircraft propulsion system of FIG. 3 with its thrust reverser doors deployed.

Each of the stowed thrust reverser doors 36 of FIG. 1 (see also FIG. 3) may axially overlap/cover one or more of the cascade structures 38 and/or an aft portion of the fixed structure 34. By covering the cascade structures 38, the thrust reverser doors 36 may generally prevent gas from flowing radially outward through the cascade structures 38 from the flowpath 44. The gas exhausted from the gas turbine engine may thereby flow (e.g., unobstructed) through the flowpath 44 and out of the aircraft propulsion system 22 through the exhaust nozzle 46. By contrast, when deployed to the deployed position of FIG. 2 (see also FIG. 4), the thrust reverser doors 36 move (e.g., pivot) outward into the exterior environment 48 outside of the aircraft propulsion system 22 and downward into the flowpath 44. This thrust reverser door movement uncovers outer sides of the cascade structures 38 and may open one or more jet pipe openings 63, where each jet pipe opening 63 of FIGS. 2 and 4 is formed and/or extends axially between a respective one of the cascade structures 38 and a respective one of the thrust reverser doors 36. The thrust reverser door movement also positions the thrust reverser doors 36 to substantially or completely block access to the exhaust nozzle 46 as well as redirect the gas flowing within the flowpath 44 radially outward and through the cascade structures 38.

Figure 5:
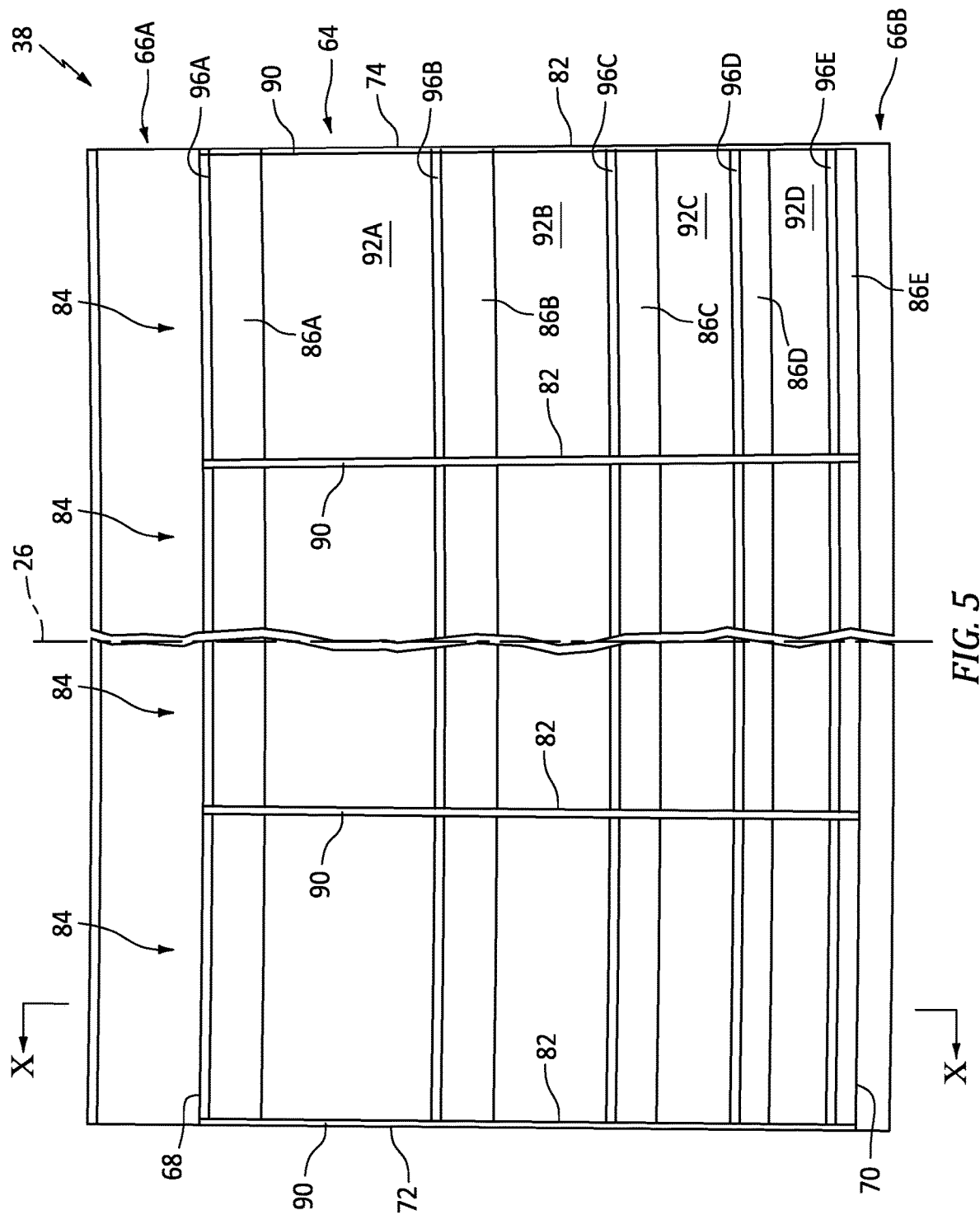
FIG. 5 is a partial illustration of an outer side of a cascade structure.
Figure 6:
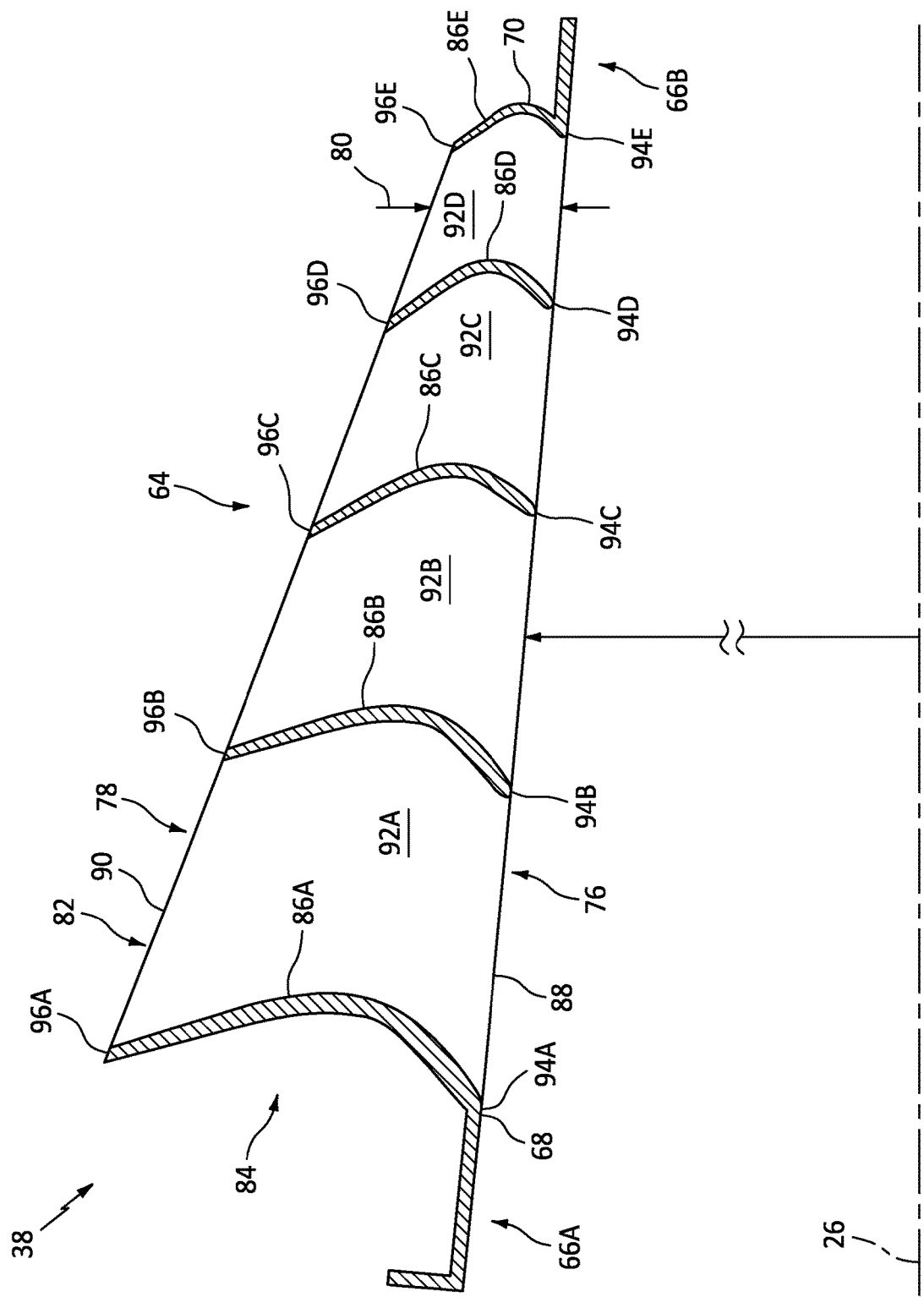
FIG. 6 is a side sectional illustration of the cascade structure of FIG. 5 taken along line X-X, where the cascade structure of FIG. 6 has a first arrangement of cascade vanes.

FIGS. 5 and 6 illustrate an exemplary one of the cascade structures 38. This cascade structure 38 includes a thrust reverser cascade 64 (e.g., a base cascade structure, a cascade basket, etc.) and one or more attachments 66 (e.g., 66A and 66B); e.g., mounting structures.

The thrust reverser cascade 64 of FIG. 5 extends longitudinally (e.g., axially along the axial centerline 26) between and to a forward end 68 of the thrust reverser cascade 64 and an aft end 70 of the thrust reverser cascade 64. The thrust reverser cascade 64 extends laterally (e.g., circumferentially about the axial centerline 26) between and to a first side 72 of the thrust reverser cascade 64 and a second side 74 of the thrust reverser cascade 64. The thrust reverser cascade 64 of FIG. 6 extends radially relative to the axial centerline 26 between and to an inner face 76 of the cascade structure 38 and its thrust reverser cascade 64 and an outer face 78 of the cascade structure 38 and its thrust reverser cascade 64. Referring to FIGS. 1 and 3, each cascade inner face 76 may follow a contour of the inner aerodynamic flow surface 42 and may bridge a gap between the structure inner side 52 and a respective one of the door inner sides 60. Each cascade inner face 76 of FIGS. 1 and 3 is thereby disposed at and extends axially along the flowpath 44 when the thrust reverser doors 36 are stowed. By contrast, referring to FIGS. 2 and 4, each cascade inner face 76 provides an inlet to the respective cascade structure 38 and its thrust reverser cascade 64 when the thrust reverser doors 36 are deployed.

Referring to FIG. 6, at least a portion or an entirety of the cascade inner face 76 may be angularly offset from at least a portion or an entirety of the cascade outer face 78. With such an arrangement, the thrust reverser cascade 64 may radially taper (e.g., a radial distance 80 between the faces 76 and 78 may decrease) as the thrust reverser cascade 64 extends longitudinally between the cascade ends 68 and 70; e.g., from the cascade forward end 68 to the cascade aft end 70. The cascade inner face 76, however, may alternatively be arranged parallel with the cascade outer face 78 such that the radial distance 80 does not change as the thrust reverser cascade 64 extends longitudinally between the cascade ends 68 and 70.

The thrust reverser cascade 64 may be configured such that a (e.g., arcuate) plane of the cascade inner face 76 has a linear (e.g., straight) sectional geometry when viewed, for example, in a first reference plane parallel with the axial centerline 26. The thrust reverser cascade 64 may also be configured such that a (e.g., arcuate) plane of the cascade outer face 78 has a linear (e.g., straight) sectional geometry when viewed, for example, in the first reference plane. The thrust reverser cascade 64, however, may alternatively be configured to provide the plane of the cascade inner face 76 and/or the plane of the cascade outer face 78 with a non-linear (e.g., curved, bent, etc.) sectional geometry when viewed, for example, in the first reference plane.

Figure 7B:
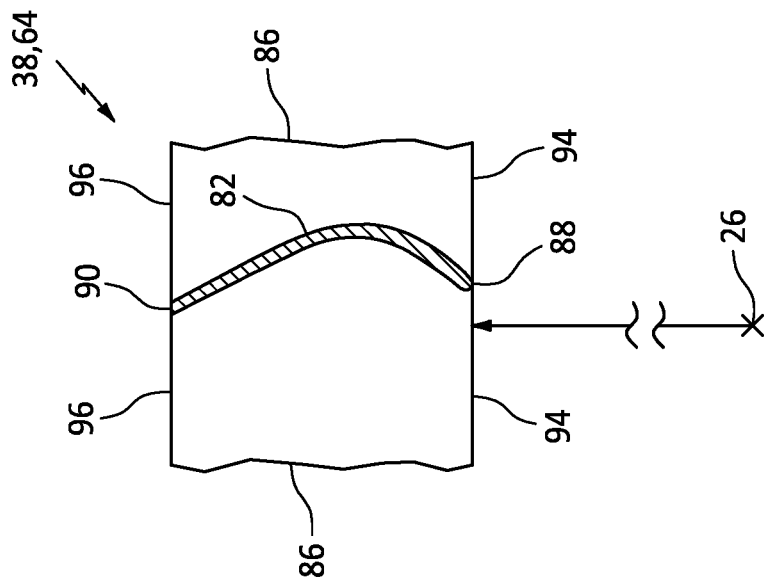
FIGS. 7A and 7B are partial sectional illustrations of a portion of the cascade structure with various arrangements of strongback rail cross-sectional geometries.
Figure 7A:
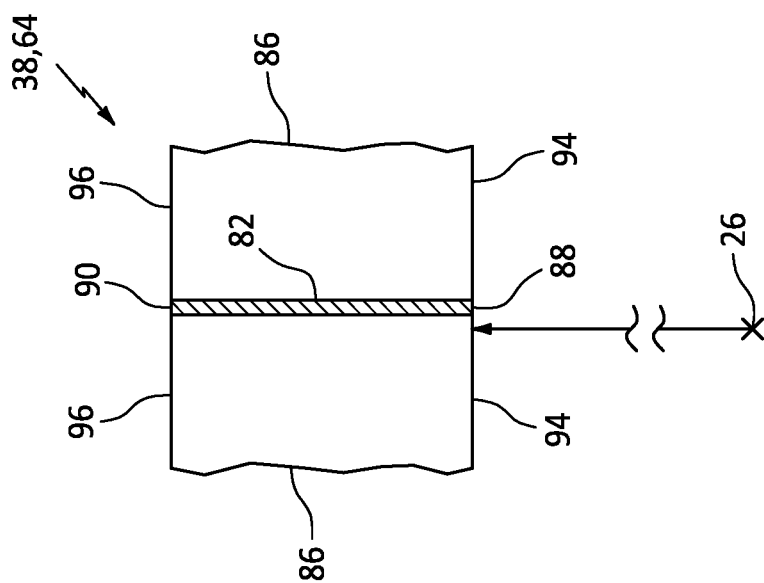

The thrust reverser cascade 64 of FIGS. 5 and 6 includes one or more strongback rails 82 and one or more arrays 84 of cascade vanes 86 (e.g., 86A-E). The strongback rails 82 of FIG. 5 are arranged in parallel with one another. Each of the strongback rails 82 extends longitudinally between and to the cascade forward end 68 and the cascade aft end 70. Each of the strongback rails 82 of FIG. 6 extends radially between and to a leading edge 88 of the respective strongback rail 82 and a trailing edge 90 of the respective strongback rail 82. The rail leading edge 88 may be disposed at (e.g., on, adjacent or proximate), radially aligned with, extend longitudinally along and/or define the plane of the cascade inner face 76. The rail trailing edge 90 may be disposed at, radially aligned with, extend longitudinally along and/or define the plane of the cascade outer face 78. Referring to FIG. 7A, each strongback rail 82 may have a linear (e.g., straight) cross-sectional geometry when viewed, for example, in a second reference plane perpendicular to the axial centerline 26. Alternatively, referring to FIG. 7B, one or more or all of the strongback rails 82 may each have a non-linear (e.g., curved) cross-sectional geometry when viewed, for example, in the second reference plane. With such a configuration, the strongback rails 82 may facilitate directing gas flow through the respective cascade structure 38 in a circumferential direction.

Referring to FIG. 5, each array 84 of the cascade vanes 86 is arranged between a respective laterally neighboring (e.g., adjacent) pair of the strongback rails 82. Each of the cascade vane arrays 84 includes a plurality of the cascade vanes 86. Within each cascade vane array 84, the cascade vanes 86 are disposed at discrete locations along a longitudinal length of the respective strongback rails 82. The forward cascade vane 86A of FIG. 5, for example, is disposed at the cascade forward end 68. This forward cascade vane 86A may form a bullnose and/or a ramp for the cascade vane array 84; see also FIG. 6. The aft cascade vane 86E of FIG. 5 is disposed at the cascade aft end 70. The intermediate cascade vanes 86B, 86C and 86D of FIG. 5 are arranged sequentially longitudinally between the forward cascade vane 86A and the aft cascade vane 86E. With this arrangement, each longitudinally neighboring (e.g., adjacent) pair of the cascade vanes 86 forms a respective channel 92 (e.g., 92A-D) (e.g., gas passage) therebetween.

Each channel 92 of FIG. 5 extends longitudinally within the thrust reverser cascade 64 between and to a respective longitudinally neighboring pair of the cascade vanes 86. Each channel 92 extends laterally within the thrust reverser cascade 64 between and to a respective laterally neighboring pair of the strongback rails 82. Referring to FIG. 6, each channel extends radially through the thrust reverser cascade 64 between an inlet of the respective channel 92 at the cascade inner face 76 and an outlet of the respective channel 92 at the cascade outer face 78.

Referring to FIG. 5, each of the cascade vanes 86 extends laterally between and to the respective laterally neighboring pair of the strongback rails 82. Each of the cascade vanes 86 may be connected to (e.g., formed integral with or bonded to) the respective laterally neighboring pair of the strongback rails 82. Each of the cascade vanes 86 of FIG. 6 extends radially between and to a leading edge 94 (e.g., 94A-E) of the respective cascade vane 86 and a trailing edge 96 (e.g., 96A-E) of the respective cascade vane 86. Radial heights of the cascade vanes 86A-E may vary (e.g., decrease); however, the present disclosure is not limited thereto. The vane leading edge 94 is disposed at (e.g., on, adjacent or proximate) the cascade inner face 76 and, thus, may be radially aligned with (or proximate to) the rail leading edge 88. The vane trailing edge 96 is disposed at (e.g., on, adjacent or proximate) the cascade outer face 78 and, thus, may be radially aligned with (or proximate to) the rail trailing edge 90. Each of the cascade vanes 86 may have a non-linear (e.g., curved) cross-sectional geometry when viewed, for example, in a third reference plane perpendicular to the respective cascade vane 86 and/or parallel with the axial centerline 26. With such a configuration, the cascade vanes 86 may facilitate directing gas flow through the respective cascade structure 38 in an axial direction; e.g., an axially forward direction.

Referring to FIGS. 5 and 6, each of the cascade attachments 66 is configured to attach/mount the respective cascade structure 38 and its thrust reverser cascade 64 to another structure of the aircraft propulsion system 22 such as, but not limited to, a forward torque box and/or an aft support ring. The cascade attachments 66 of FIGS. 5 and 6, for example, are configured as attachment flanges. The forward cascade attachment 66A is disposed at the cascade forward end 68, and is connected (e.g., formed integral with or bonded to) the thrust reverser cascade 64 and its elements 82 and 86A. The forward attachment of FIG. 6 forms a segment of the inner aerodynamic flow surface 42 longitudinally adjacent and upstream of the cascade vane 86A; e.g., the cascade bullnose and/or the cascade ramp. The aft cascade attachment 66B is disposed at the cascade aft end 70, and is connected (e.g., formed integral with or bonded to) the thrust reverser cascade 64 and its elements 82 and 86E. The aft attachment of FIG. 6 forms a segment of the inner aerodynamic flow surface 42 longitudinally adjacent and downstream of the cascade vane 86E.

Figure 8:
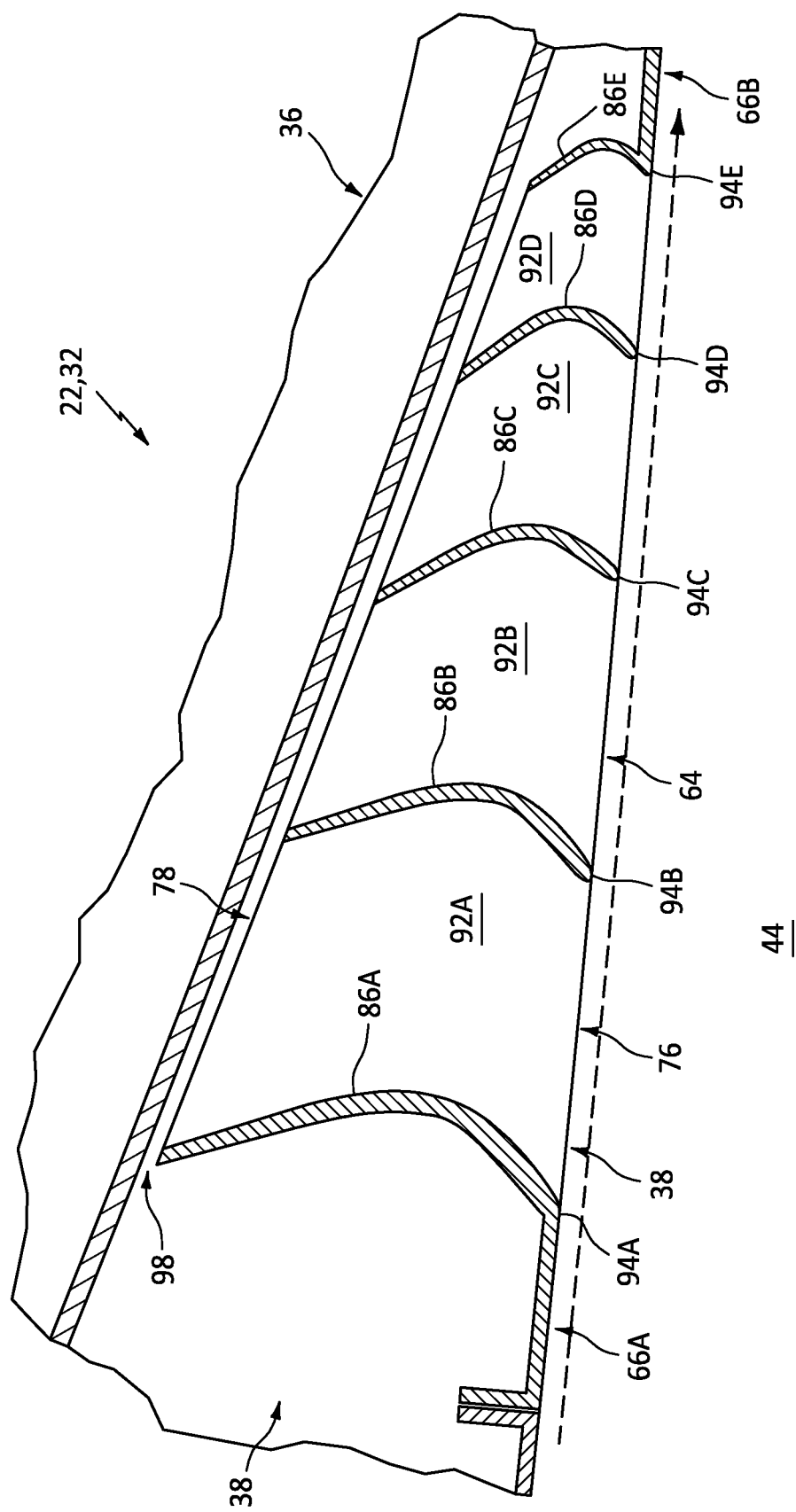
FIG. 8 is a side sectional illustration of a portion of the aircraft propulsion system with the cascade structure of FIG. 6 depicted during forward thrust operation.

Referring to FIG. 8, when the thrust reverser doors 36 are stowed, the gas within the flowpath 44 flows axially along and across each cascade inner face 76 (see also FIGS. 1 and 3). Where each of the vane leading edges 94 is disposed on, radially aligned with, extends laterally along and/or defines the plane of the cascade inner face 76, the gas flow may interact with the respective cascade structure 38 and its cascade vanes 86 and generate an audible sound. For example, the gas flow grazing over the cascade vanes 86 and their vane leading edges 94 may excite an acoustic feedback mechanism from shear layer impingement; e.g., Rossiter modes. This noise may be amplified by volumes (e.g., the channels 92) within the respective cascade structure 38 and/or a closed volume 98 between the respective cascade structure 38 and the overlapping stowed thrust reverser door 36. More particularly, the Rossiter modes may couple with cavity back-volume acoustic modes. This sound may propagate within the aft structure 30 and may increase a noise signature of the aircraft propulsion system 22.

To disrupt, mitigate and/or prevent the sound generated by the flow of gas across the cascade structures 38, one or more or all of the cascade structures 38 may each be configured with one or more radially recessed cascade vanes 86 such that at least some of the vane leading edges 94 are misaligned along the respective cascade inner face 76. Exemplary cascade structures 38 with such radially recessed cascade vane(s) 86 are shown in FIGS. 9-12. By recessing one or more of the cascade vanes 86/misaligning at least some of the vane leading edges 94, the Rossiter modes may be avoided or attenuated since the gas flowing axially along and across the respective cascade inner face 76 may no longer interact with (or interact less with) the recessed cascade vane(s) 86.

Figure 9:
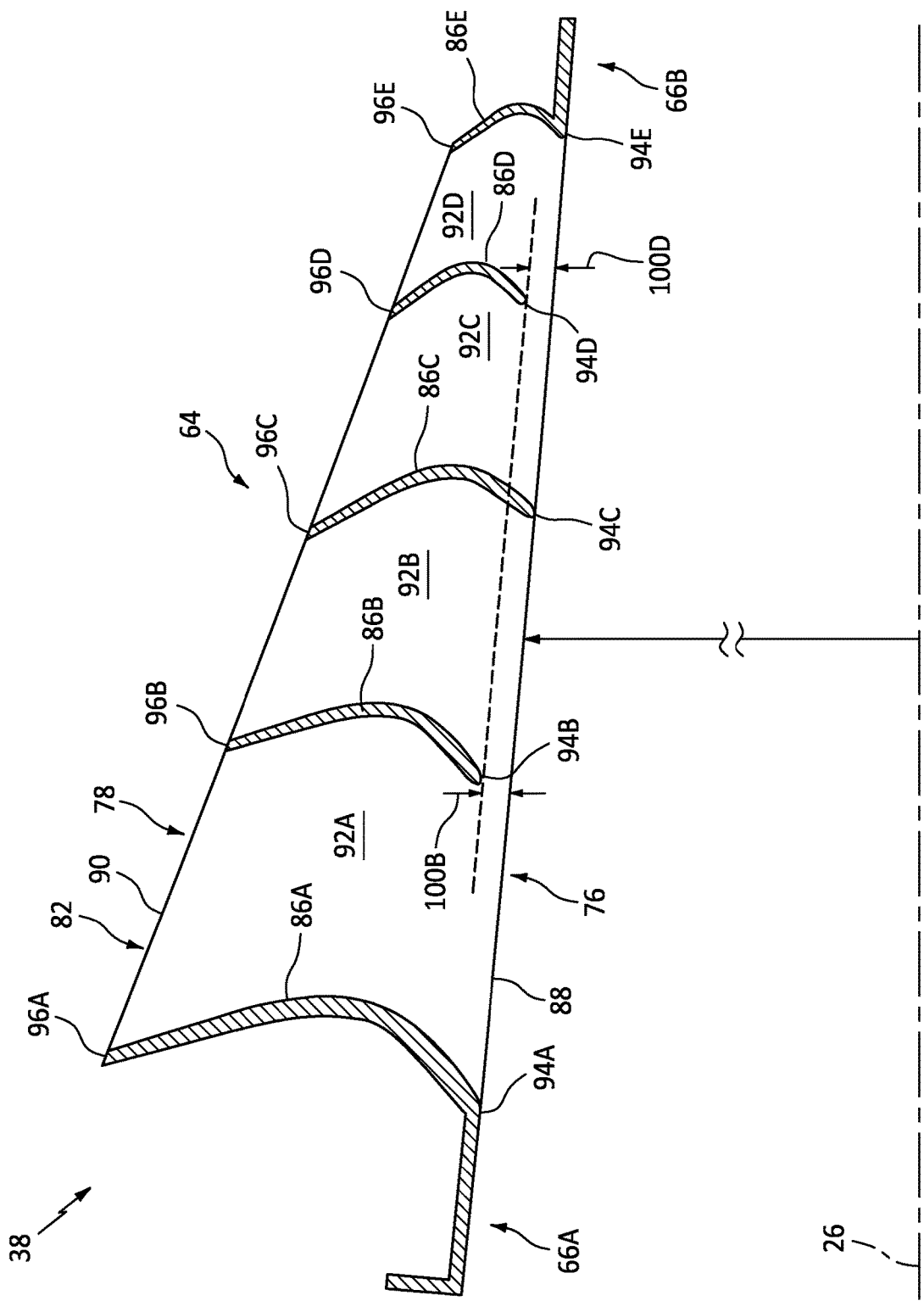
FIG. 9 is a side sectional illustration of the cascade structure of FIG. 5 taken along line X-X, where the cascade structure of FIG. 9 has a second arrangement of cascade vanes.

Referring to FIG. 9, the vane leading edge 94A, 94C, 94E of each cascade vane 86A, 86C, 86E is disposed on, radially aligned with, extends laterally along and/or defines the plane of the cascade inner face 76. By contrast, the vane leading edge 94B, 94D of each cascade vane 86B, 86D is recessed radially into the respective cascade structure 38 from the cascade inner face 76. More particularly, each vane leading edge 94B, 94D is spaced radially outward from the cascade inner face 76 by a respective radial height 100 (e.g., 100B, 100D). The radial heights 100 of FIG. 9 are equal to one another; however, the radial heights 100 may alternatively be different. Furthermore, the vane trailing edge 96 of one or more or all of the cascade vanes 86 may be disposed on, radially aligned with, extends laterally along and/or defines the plane of the cascade outer face 78.

Figure 10:
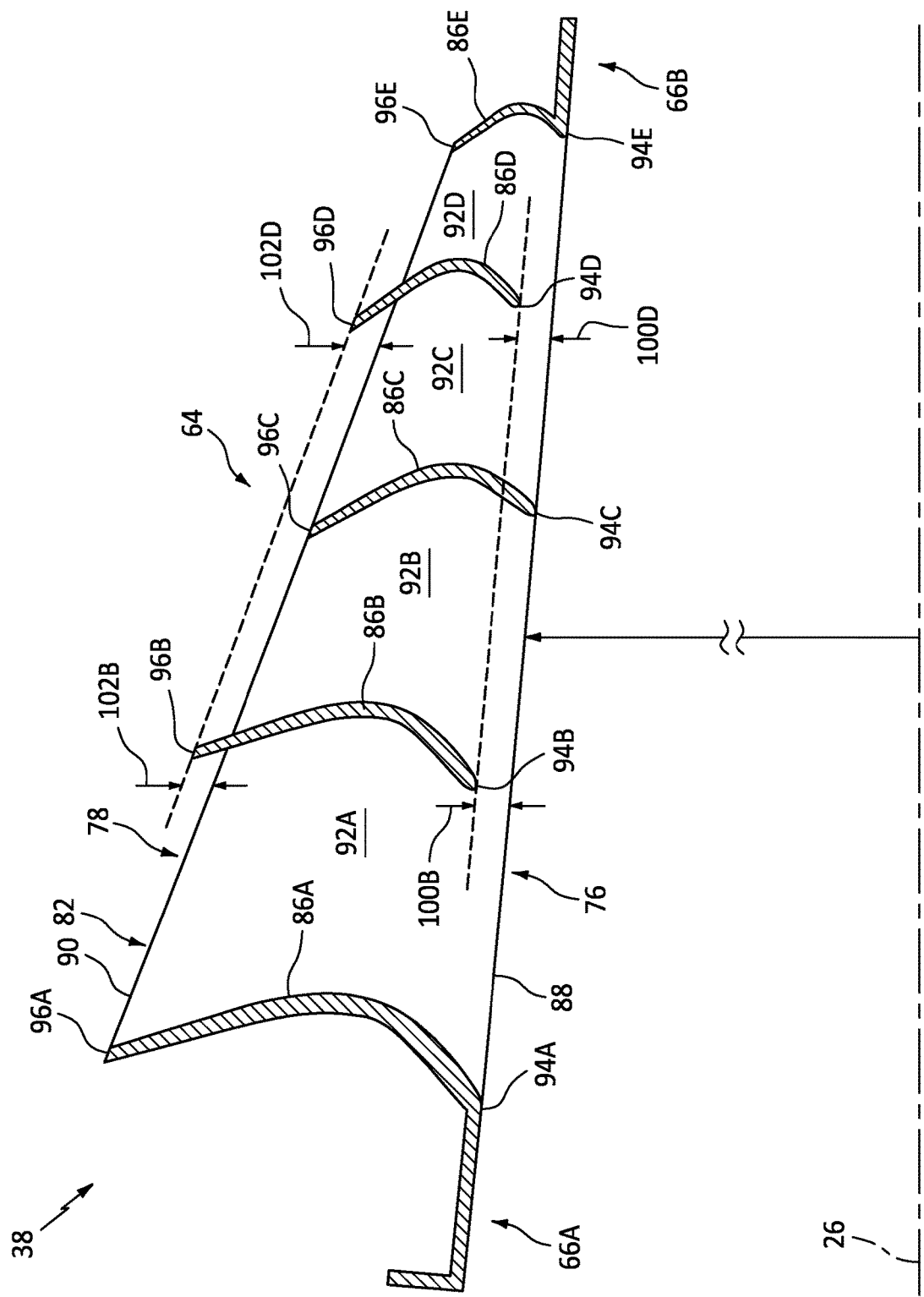
FIG. 10 is a side sectional illustration of the cascade structure of FIG. 5 taken along line X-X, where the cascade structure of FIG. 10 has a third arrangement of cascade vanes.

Referring to FIG. 10, the vane leading edge 94A, 94C, 94E of each cascade vane 86A, 86C, 86E is disposed on, radially aligned with, extends laterally along and/or defines the plane of the cascade inner face 76. By contrast, the vane leading edge 94B, 94D of each cascade vane 86B, 86D is recessed radially into the respective cascade structure 38 from the cascade inner face 76. More particularly, each vane leading edge 94B, 94D is spaced radially outward from the cascade inner face 76 by the respective radial height 100 (e.g., 100B, 100D). The radial heights 100 of FIG. 10 are equal to one another; however, the radial heights 100 may alternatively be different. Furthermore, the vane trailing edge 96A, 96C, 96E of each cascade vane 86A, 86C, 86E is disposed on, radially aligned with, extends laterally along and/or defines the plane of the cascade outer face 78. By contrast, the vane trailing edge 96B, 96D of each cascade vane 86B, 86D (e.g., each recessed cascade vane) projects radially out from the cascade outer face 78. More particularly, each vane trailing edge 96B, 96D is spaced radially outward from the cascade outer face 78 by a respective radial height 102 (e.g., 102B, 102D). The radial heights 102 of FIG. 10 are equal to one another; however, the radial heights 102 may alternatively be different.

Figure 11:
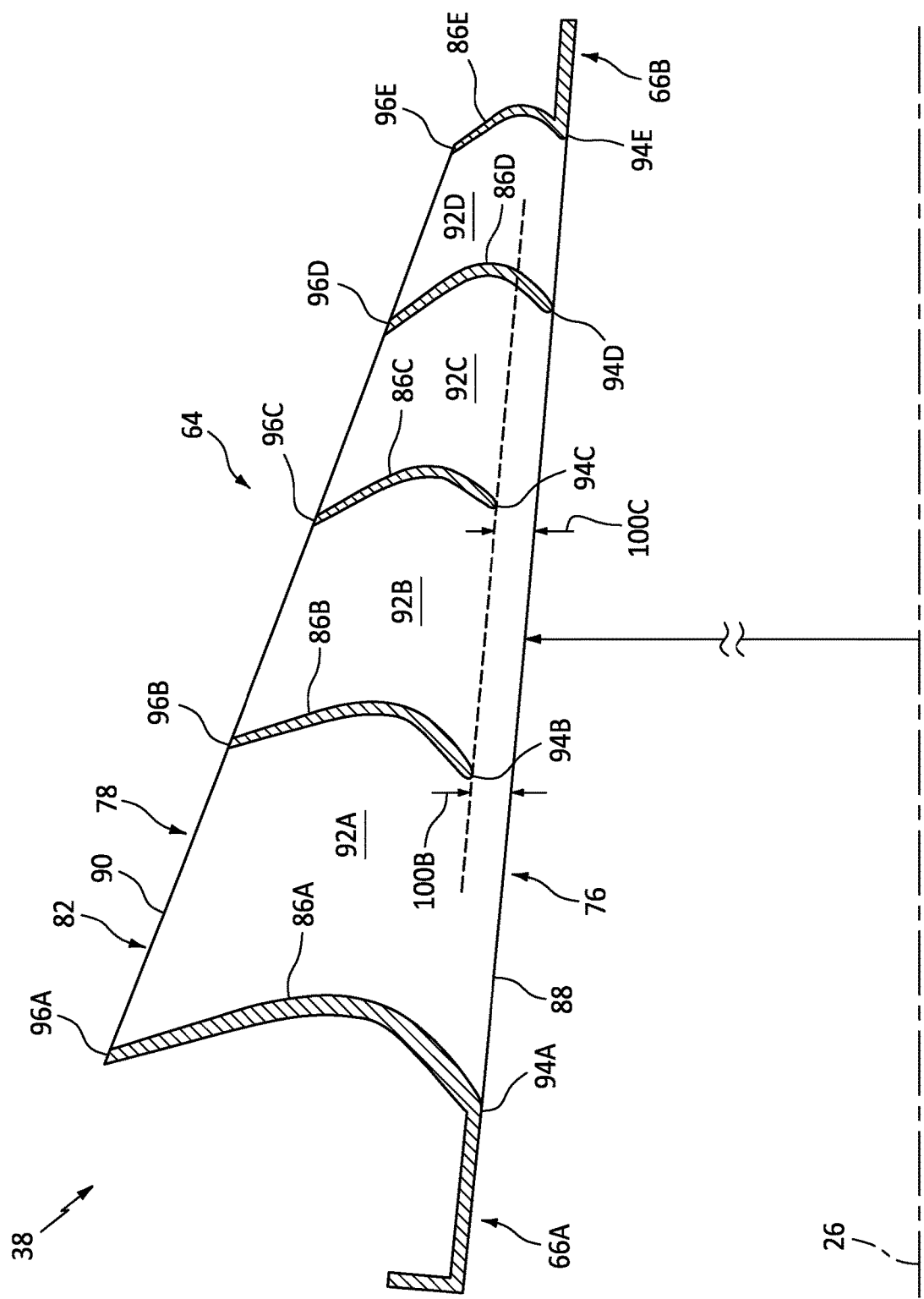
FIG. 11 is a side sectional illustration of the cascade structure of FIG. 5 taken along line X-X, where the cascade structure of FIG. 11 has a fourth arrangement of cascade vanes.
Figure 12:
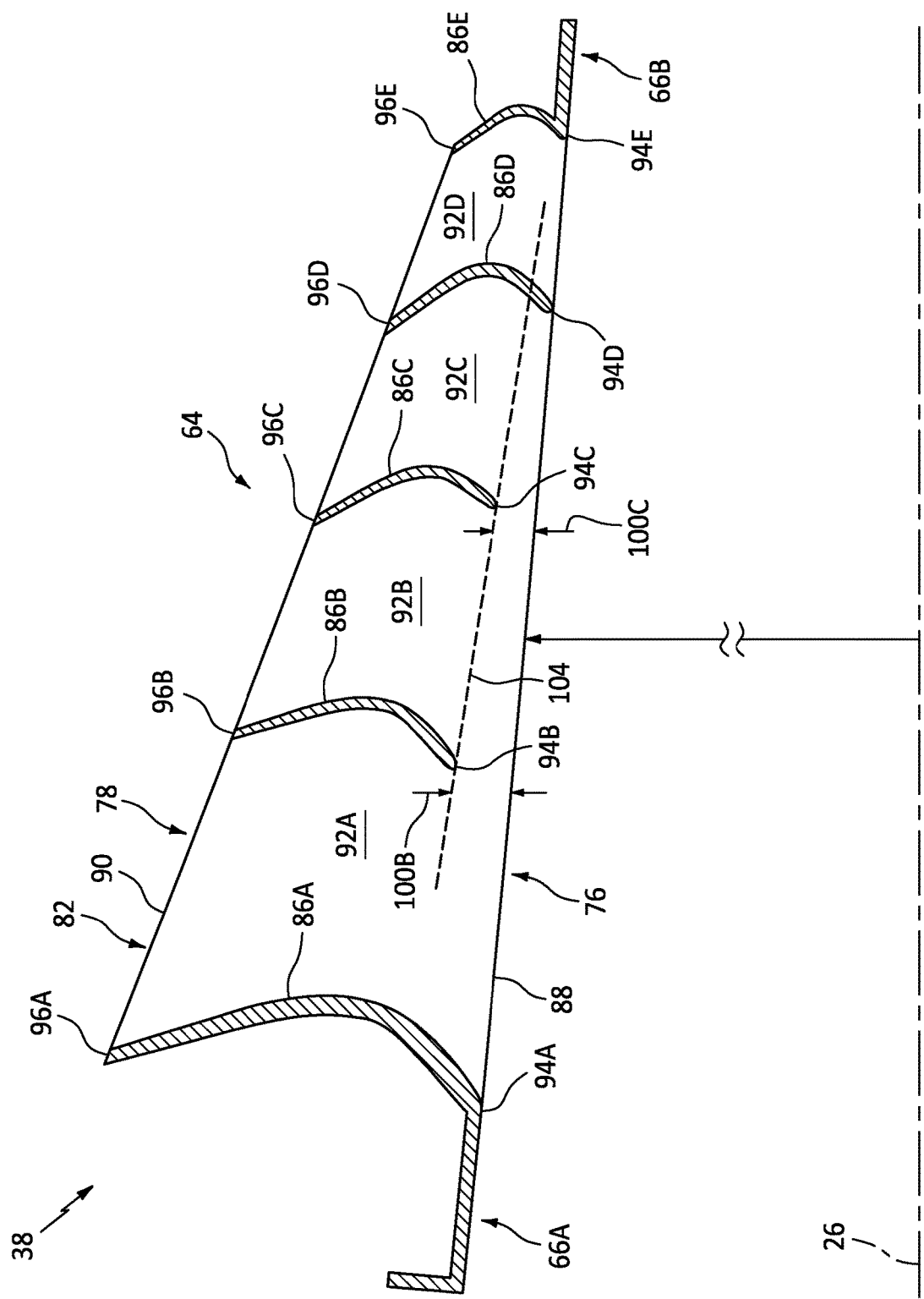
FIG. 12 is a side sectional illustration of the cascade structure of FIG. 5 taken along line X-X, where the cascade structure of FIG. 12 has a fifth arrangement of cascade vanes.

Referring to FIG. 11, the vane leading edge 94A, 94D, 94E of each cascade vane 86A, 86D, 86E is disposed on, radially aligned with, extends laterally along and/or defines the plane of the cascade inner face 76. By contrast, the vane leading edge 94B, 94C of each cascade vane 86B, 86C is recessed radially into the respective cascade structure 38 from the cascade inner face 76. More particularly, each vane leading edge 94B, 94C is spaced radially outward from the cascade inner face 76 by a respective radial height 100 (e.g., 100B, 100C). The radial heights 100 of FIG. 11 are equal to one another. However, referring to FIG. 12, the radial heights 100 may alternatively be different. The radial height 100B, for example, may be greater than the radial height 100C such that the vane leading edges 94 may define another plane 104 which is angularly offset from the cascade inner face plane. Furthermore, the vane trailing edge 96 of one or more or all of the cascade vanes 86 of FIGS. 11 and 12 may be disposed on, radially aligned with, extends laterally along and/or defines the plane of the cascade outer face 78.

While the arrangements shown in FIGS. 9-12 are individually described, various features from these arrangements may be combined. Furthermore, it is contemplated each cascade vane array 84 in a respective thrust reverser cascade 64 may have a common (the same) configuration. However, it is also contemplated at least one cascade vane array 84 in a respective thrust reverser cascade 64 may have a different configuration than another cascade vane array 84 in that thrust reverser cascade 64. For example, any combination of the arrangements in FIGS. 9-12 may be configured into a single one of the thruster reverser cascades 64. The present disclosure, of course, is not limited to the foregoing exemplary arrangements.

Figure 13:
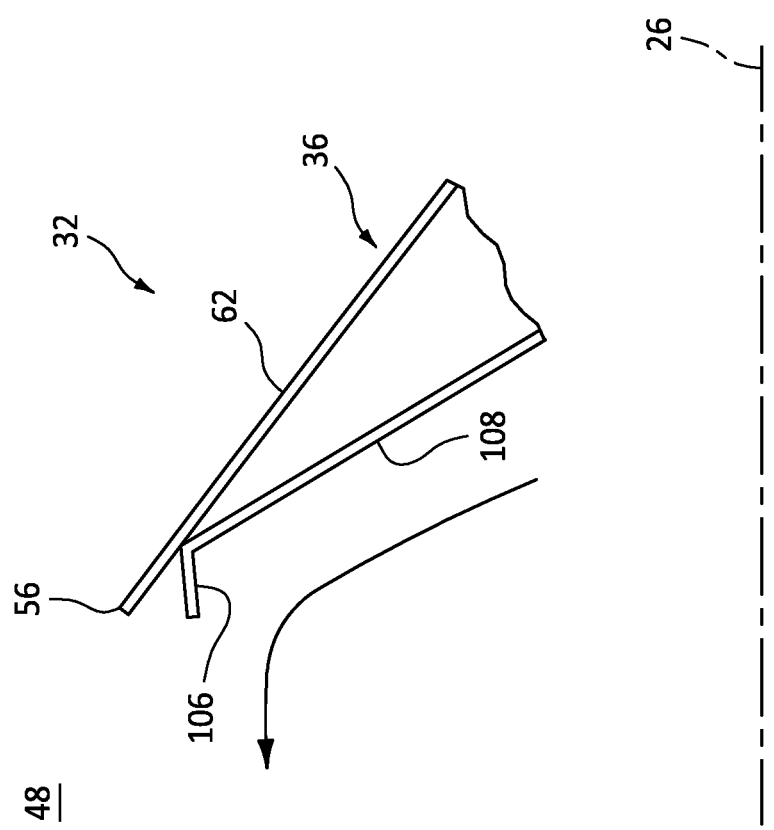
FIG. 13 is a partial sectional illustration of one of the thrust reverser doors with a kicker frame.

In some embodiments, referring to FIG. 13, one or more of the thrust reverser doors 36 may each include a kicker frame 106 at the door forward end 56. This kicker frame 106 may meet a ramp surface 108 of the respective thrust reverser doors 36. The ramp surface 108 directs air passing radially outward through the thrust reverser system 32 when deployed to the kicker frame 106. The kicker frame 106 redirects the air in an axially forward direction.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:
a propulsion system structure extending along an axial centerline including a nacelle having a fixed structure, a flowpath and a thrust reverser system, the flowpath extending within the propulsion system structure to an exhaust nozzle, and the thrust reverser system comprising a thrust reverser cascade and a thrust reverser door;
the thrust reverser cascade extending longitudinally between a cascade forward end and a cascade aft end, the thrust reverser cascade extending laterally between a cascade first side and a cascade second side, and the thrust reverser cascade extending radially between a cascade inner face and a cascade outer face, the thrust reverser cascade is fixed to the fixed structure;
the thrust reverser cascade including a plurality of vanes and a plurality of rails;
the plurality of vanes arranged in a plurality of longitudinally extending arrays, the plurality of vanes comprising a first vane and a second vane, a leading edge of the first vane disposed on the cascade inner face, and a leading edge of the second vane recessed radially into the thrust reverser cascade from the cascade inner face;
the plurality of rails extending longitudinally along and connected to the plurality of vanes, the plurality of rails comprising a first rail with a first radial height, and the first radial height of the first rail decreasing as the first rail extends longitudinally from the cascade forward end to the cascade aft end, wherein each of the plurality of arrays is arranged between a respective laterally neighboring or adjacent pair of rails; and
the thrust reverser door configured to pivot between a stowed position and a deployed position, a first portion of the thrust reverser door radially outboard of and axially covering the thrust reverser cascade when the thrust reverser door is in the stowed position, and a second portion of the thrust reverser door forming a radial outer peripheral boundary of the flowpath between the thrust reverser cascade and the exhaust nozzle when the thrust reverser door is in the stowed position,
wherein:
a trailing edge of the first vane is disposed on the cascade outer face; and
a trailing edge of the second vane is spaced radially from the cascade outer face.

2. The apparatus of claim 1, wherein a plane of the cascade inner face has a straight sectional geometry as the thrust reverser cascade extends longitudinally from the cascade forward end to the cascade aft end.

3. The apparatus of claim 1, wherein a leading edge of each of the plurality of rails is disposed on the cascade inner face.

4. The apparatus of claim 1, wherein
the first rail extends radially to a rail leading edge;
the leading edge of the first vane is radially aligned with the rail leading edge; and
the leading edge of the second vane is spaced radially from the rail leading edge.

5. The apparatus of claim 1, wherein the first vane is longitudinally forward of the second vane.

6. The apparatus of claim 1, wherein the first vane is longitudinally aft of the second vane.

7. The apparatus of claim 1, wherein a radial height of the first vane is different than a radial height of the second vane.

8. The apparatus of claim 1, wherein
the plurality of vanes further comprise a third vane; and
a leading edge of the third vane is disposed on the cascade inner face.

9. The apparatus of claim 8, wherein the second vane is longitudinally between the first vane and the third vane.

10. The apparatus of claim 1, wherein
the plurality of vanes further comprise a third vane; and
a leading edge of the third vane is recessed radially into the thrust reverser cascade from the cascade inner face.

11. The apparatus of claim 10, wherein
the leading edge of the second vane is disposed a second vane distance from the cascade inner face; and
the leading edge of the third vane is disposed a third vane distance from the cascade inner face that is equal to the second vane distance.

12. The apparatus of claim 10, wherein
the leading edge of the second vane is disposed a second vane distance from the cascade inner face; and
the leading edge of the third vane is disposed a third vane distance from the cascade inner face that is different than the second vane distance.

13. The apparatus of claim 10, wherein the second vane is longitudinally between the first vane and the third vane.

14. The apparatus of claim 10, wherein the first vane is longitudinally between the second vane and the third vane.

15. The apparatus of claim 1, wherein the thrust reverser cascade is exposed to the flowpath when the thrust reverser door is in the stowed position.

16. The apparatus of claim 1, wherein the second portion of the thrust reverser door is configured to move radially into the flowpath when the thrust reverser door pivots from the stowed position into the deployed position.

17. The apparatus of claim 1, wherein
the leading edge of the first vane is upstream of the trailing edge of the first vane along the axial centerline; and
the first vane includes a non-linear cross-sectional geometry along the axial centerline such that a portion between the leading edge of the first vane and the trailing edge of the first vane is aft of the leading edge of the first vane and aft of the trailing edge of the first vane.

18. The apparatus of claim 17, wherein
the leading edge of the second vane is upstream of the trailing edge of the second vane along the axial centerline; and
the second vane includes a non-linear cross-sectional geometry along the axial centerline such that a portion between the leading edge of the second vane and the trailing edge of the second vane is aft of the leading edge of the second vane and aft of the trailing edge of the second vane.

19. An apparatus for an aircraft propulsion system, comprising:
a propulsion system structure extending along an axial centerline including a nacelle having a fixed structure, a flowpath and a thrust reverser system, the flowpath extending within the propulsion system structure to an exhaust nozzle, and the thrust reverser system comprising a thrust reverser cascade and a thrust reverser door, the thrust reverser cascade fixed to the fixed structure;
the thrust reverser cascade extending longitudinally between a cascade forward end and a cascade aft end, the thrust reverser cascade extending laterally between a cascade first side and a cascade second side, the thrust reverser cascade extending radially between a cascade inner face and a cascade outer face which is angular offset from the cascade inner face in a reference plane, the cascade inner face configured with a straight sectional geometry in the reference plane as the cascade inner face extends longitudinally from the cascade forward end to the cascade aft end, and the cascade outer face configured with a straight sectional geometry in the reference plane as the cascade outer face extends longitudinally from the cascade forward end to the cascade aft end;
the thrust reverser cascade including a plurality of vanes distributed longitudinally along the cascade inner face, the plurality of vanes comprising a first vane and a second vane, the first vane extending radially to a first vane leading edge, the second vane extending radially to a second vane leading edge, and the first vane leading edge and the second vane leading edge are radially misaligned along the cascade inner face; and
the thrust reverser door configured to pivot between a stowed position and a deployed position, a first portion of the thrust reverser door radially outboard of and axially covering the thrust reverser cascade when the thrust reverser door is in the stowed position, and a second portion of the thrust reverser door forming a radial outer peripheral boundary of the flowpath between the thrust reverser cascade and the exhaust nozzle when the thrust reverser door is in the stowed position.

20. An apparatus for an aircraft propulsion system, comprising:
a propulsion system structure extending along an axial centerline including a nacelle having a fixed structure, a flowpath and a thrust reverser system, the flowpath extending within the propulsion system structure to an exhaust nozzle, and the thrust reverser system comprising a thrust reverser cascade and a thrust reverser door, the thrust reverser cascade is fixed to the fixed structure;
the thrust reverser cascade extending longitudinally between a cascade forward end and a cascade aft end, the thrust reverser cascade extending laterally between a cascade first side and a cascade second side, and the thrust reverser cascade extending radially between a cascade inner face and a cascade outer face, the cascade inner face and the cascade outer face radially converging towards one another as the cascade inner face and the cascade outer face extend longitudinally from cascade forward end to cascade aft end, and the thrust reverser cascade including a first rail, a second rail and a plurality of vanes laterally between and connected to the first rail and the second rail;
the first rail extending radially to a rail leading edge;
the plurality of vanes including a first vane and a second vane, the first vane extending radially to a first vane leading edge that is radially aligned with the rail leading edge, and the second vane extending radially to a second vane leading edge that is recessed into the thrust reverser cascade and radially spaced from the rail leading edge; and
the thrust reverser door configured to pivot between a stowed position and a deployed position, a first portion of the thrust reverser door radially outboard of and axially covering the thrust reverser cascade when the thrust reverser door is in the stowed position, and a second portion of the thrust reverser door forming a radial outer peripheral boundary of the flowpath between the thrust reverser cascade and the exhaust nozzle when the thrust reverser door is in the stowed position.

\* \* \* \* \*